Patented Sept. 5, 1933

1,925,267

UNITED STATES PATENT OFFICE 1,925,267

CEREAL FOOD

Eugene H. McKay, Battle Creek, Mich., assignor to Kellogg Company, Battle Creek, Mich, a corporation of Delaware No Drawing. Application April 15, 1929, Serial No. 355,414, and in Great Britain October 8, 1928

8 Claims. (Cl. 99—10)

My invention relates to cereal foods, this application being a continuation in part of my copending application, Serial No. 232,473, filed November 10, 1927.

One of the objects of my invention is to produce a cereal food having certain desirable physical characteristics, giving an improved crisp and delicate product.

A further object is to provide an improved ready-to-eat puffed cereal product and a method for making this.

Further objects will appear from the description and claims.

In my improved process, a new set of conditions for puffing are introduced. The cooked cereal, which may be in the form of whole or broken kernels of grain, is partially dried, so as to become of a pliable, rubbery structure, containing 15% to 30% moisture. The partially dried grain is formed to shape by any known means such as rolling, flaking, shredding, extruding, etc., care being taken not to form the grain at too low a moisture content, lest cracking of the grain be caused, with an attendant unsatisfactory structure. The formed grain is now subjected to a further period of drying, so as to reduce it to a hard, brittle condition whereby a subsequent heat treatment will cause the grain to become puffed and expanded. I have found that with many cereals a moisture content of from 5% to 14% at this stage will give satisfactory results. Following this latter drying operation, the grain is subjected to a high temperature for puffing and toasting. This puffing operation will result in the production of food having a high degree of puffiness, together with a crisp tender structure which yields readily when chewed. It is characteristic of this product that it is easier to chew than the food produced by customary methods, and also gives a product of extremely low density. The use of this process further permits the production of food in shapes which would be too hard and tough when produced under prior methods.

In carrying out the new process, cereal grains of the same or several varieties, may be cooked, in any known manner, as in a rotary steam cooker, retort, pan, or other device, with the addition of water and with flavoring materials if desired. The time of cooking and the steam pressure employed will vary with the nature of the material. The cooked material is partially dried, until a tough, rubbery product is obtained. A "tempering" operation, for securing a uniform moisture content may be employed, if desired. The material may now be formed to the desired shape by rolling, flaking, shredding, extruding, or otherwise securing the desired form by mechanical means. The formed material is then subjected to another drying operation, wherein the food is reduced to the desired moisture content and physical condition to fit it for the subsequent puffing treatment. The food may then be heated by any known means to a temperature of 350 degrees to 600 degrees Fahr., as in an oven or over a source of heat, preferably keeping the food in motion. The food will swell upon reaching a certain temperature, and will expand to several times its initial size. The heating may be continued until the product has assumed the desired brown color.

The product resulting from the process consists in its most desirable form, of a ready-to-eat cooked cereal food having the following characteristics, that is to say, the product is crisp throughout, friable, puffed or enlarged to greatly increased size, and toasted, and in the case of individual kernels of grains the physical identity of the original kernels is destroyed. The puffed and toasted units have an internal bubbly or cellular formation and are materially different in shape and form from the shape of the original units and are non-uniform in contour. In its most advantageous form the product has the characteristic of retaining its crispness and friability even when used with milk and is substantially unaffected by atmospheric conditions.

The following example sets forth, in detail, a method as applied to a rice product though it is obvious that the method is applicable by suitable modification to other cereal products.

To fifty pounds of rice are added one and one-half gallons of water, three pounds of sugar and one pound of salt. The mixture is placed in a rotary cooker and cooked under 15 pounds steam pressure for one or two hours, or until all kernels of rice are thoroughly cooked. The cooked material is partially dried to a moisture content of between 15% and 30%, to give it a rubbery consistency, and cooled, so as to yield individual kernels of rice having a rubbery texture. In this condition the cereal is passed between revolving flat or grooved rolls so as to produce the desired particle, which in this example may be in the form of flakes. The material thus formed to shape is subjected to a further drying operation so as to render the formed material hard and brittle. I have found that very satisfactory results are obtained in treating rice if the drying step is carried to an extent which will reduce the moisture content to between 5 and 14%. In practice the moisture content of the rice after rolling is reduced to about 10 to 12%. The dried particles are then heated in a rotary oven at a temperature of 450 degrees to six hundred degrees Fahr. until the food is properly puffed and toasted.

If desired, the product need not be puffed immediately after the pre-puffing drying step, as the product after this drying step will remain in proper condition for puffing a long time. It may be packaged after the drying step and thereafter toasted by the purchaser to produce the final puffed product.

The following is set forth as another example of a method for practicing the invention: Six pounds of rice, six ounces of sugar, two ounces of salt, and one quart of water are placed in a pan and cooked in a retort for about one-half hour at fifteen pounds steam pressure. The cooked rice is dried until free from surface moisture, and then passed between revolving rolls, set so as to slightly compress the kernels without, however, reducing them to flakes or materially rupturing the external surfaces of the kernels, thus modifying the internal structure so as to facilitate swelling. The rice is then further dried until hard and brittle, after which it may be placed in a revolving cylinder or a popper and heated rapidly, so as to cause a swelling or expansion of the kernel. When the kernel has swelled to several times its initial volume, and has attained the desired degree of brown color, the rice may be cooled.

The amount of compression of the kernels may vary within limits. I have found that very satisfactory results are obtained by compressing the kernel to a thickness of 35 thousandths of an inch, although satisfactory results are obtained with thicknesses which are considerably greater or considerably less than this. In this process I have found that very satisfactory results are obtained by drying the material prior to the puffing and toasting step to a moisture content of between 5 and 14%.

This method gives a product which in bulk may have a specific gravity of about 0.15.

The amount of compression is such that the rice kernel is deformed somewhat, but not sufficiently to materially rupture the surface, and the final product of this particular method of practicing the invention is not thin enough to be classified as a flake.

While certain steps in the process appear to be specially beneficial when whole grain or cereal is used and particularly when whole rice is used, the invention in its broader aspects is not limited to rice or whole grain but contemplates the use of various cereals and cereals which are not whole grains in their final form, such as shreds, ribbons, etc.

I claim:

1. A method of making a ready-to-eat cereal food product comprising cooking the cereal in moisture, deforming the cooked cereal without, however, reducing the same to flakes, drying the deformed cereal to a moisture content of between 5 and 14%, and thereafter subjecting the dried cereal to heat at a puffing temperature to cause it to expand to several times its initial volume.

2. A method of making a ready-to-eat rice food food product, comprising cooking the rice in moisture, deforming the cooked rice without, however, reducing the same to flakes, drying the deformed product to a moisture content of between 5 and 14%, and thereafter subjecting the dried rice grains to heat at a temperature sufficient to cause the individual grains to become puffed to several times their initial volume.

3. A method of making a puffed rice ready-to-eat food product comprising the cooking of the rice, partially drying the cooked rice until the kernels are tough and rubbery, slightly flattening the individual rice kernels without substantially rupturing the external surfaces of the kernels, drying the kernels until hard and brittle and thereafter heating the dried kernels to cause them to become puffed to greatly increased size.

4. A method of making a puffed ready-to-eat cereal food product comprising cooking cereal, partially drying the cooked cereal until the units thereof are tough and rubbery, deforming the cooked cereal without however reducing the same to flaked condition, drying the deformed product until the units are hard and brittle, and thereafter heating the dried product to cause it to become puffed to several times its initial volume.

5. A rice food product prepared for puffing comprising a cooked, hard and brittle flattened rice kernel having a moisture content of between 5 and 14%, a modified internal structure and substantially unruptured external surface and which when subjected to heat treatment of between 350° and 600° F. puffs up bodily to greatly increased size, with a specific gravity in bulk of between 0.12 and 0.20.

6. A method of making a ready-to-eat rice food product comprising cooking rice in moisture, flattening the rice kernels individually without however reducing them to flakes and without substantially rupturing the surfaces of the kernels, drying the flattened kernels until hard and brittle, and thereafter subjecting the kernels to dry heat to cause them to puff up to greatly increased size.

7. A method of making a puffed ready-to-eat food product comprising cooking a quantity of rice grains in the presence of moisture, drying the grains sufficiently to remove the surface moisture but leaving them still plastic in their entirety, deforming the grains individually by pressure sufficiently to modify the internal structure without materially rupturing the external surface, then drying the deformed grains to a moisture content of about 10 to 12%, and thereafter subjecting the grains to dry heat whereby they become toasted, puffed and materially enlarged.

8. A ready-to-eat cereal food consisting of individual kernels of crisp, friable, cooked, puffed, toasted rice expanded bodily several times the size of the original kernels and having a specific gravity in bulk of between 0.08 and 0.20.

EUGENE H. McKAY.